United States Patent [19]

Oosaka et al.

[11] 3,972,582

[45] Aug. 3, 1976

[54] LASER BEAM RECORDING SYSTEM

[75] Inventors: Shigenori Oosaka; Masaru Noguchi; Tsunehiko Takahashi, all of Asaka, Japan

[73] Assignee: Fuji Photo Film Co., Ltd., Japan

[22] Filed: Sept. 4, 1974

[21] Appl. No.: 503,090

[30] Foreign Application Priority Data

Sept. 7, 1973 Japan............................ 48-100826

[52] U.S. Cl............................................ 350/7; 350/6; 350/3.5
[51] Int. Cl.².................................................. G02B 27/17
[58] Field of Search ................... 350/6, 7, 3.5, 1.9; 331/94.5

[56] References Cited
UNITED STATES PATENTS

| | | | |
|---|---|---|---|
| 2,543,463 | 2/1951 | Malm | 350/6 |
| 3,701,999 | 10/1972 | Congleton et al. | 350/6 |
| 3,762,793 | 10/1973 | Ullstig | 350/6 |
| 3,870,394 | 3/1975 | Ploeckl | 350/191 |

OTHER PUBLICATIONS

Sincerbox, Formation of Optical Elements by Holography, Aug. 1967, vol. 10, No. 3, I.B.M. Technical Disclosure Bulletin.

Primary Examiner—John K. Corbin
Assistant Examiner—B. W. de los Reyes
Attorney, Agent, or Firm—Fleit & Jacobson

[57] ABSTRACT

A rotary polygonal mirror is used to horizontally deflect a laser beam emitted by a laser source. A cylindrical lens is provided between the laser source and the rotary polygonal mirror for vertically converging the laser beam to form a horizontally extending light spot on the face of the rotary mirror. The beam reflected by the face of the mirror is vertically collimated and horizontally converged by a convergent lens to form a vertically extending light spot on an elemental hologram plate. By the hologram plate, the beam is vertically converged. Behind the hologram plate is located another cylindrical lens for horizontally converging the beam. By the vertical convergence effect of the elemental hologram plate and the horizontal convergence effect of the second cylindrical lens, the laser beam incident to the elemental hologram plate is converged to a minute light spot on a focusing plane. A microfilm is located on the focusing plane and the laser beam scans the microfilm to record information thereon.

4 Claims, 5 Drawing Figures

LASER BEAM RECORDING SYSTEM

BACKGROUND OF THE INVENTION

1. Field of the Invention

This invention relates to a laser beam recording system, and more specifically to an optical system for deflecting a laser beam to make it scan a recording medium of small area such as a microfilm. The laser beam recording system in accordance with the present invention is particularly applicable to a high speed information recording system used for recording computer output information on a microfilm.

2. Description of the Prior Art

In view of the high power of the laser beam which is able to record information on a recording medium of low sensitivity, it has been proposed and practiced to use a laser beam in a high speed information recording system in which information is recorded at a high speed on a microfilm. In the laser beam recording system, a laser beam deflecting means is imployed to make the laser beam scan the microfilm.

As for the conventional laser beam deflecting means, a beam deflector employing an acousto-optic effect, a beam deflector employing an electro-optic effect, a beam deflector using a rotary polygonal optical element such as a rotary polygonal mirror or a rotary polygonal prism, and a beam deflector using a vibrating mirror such as a galvanometer are known and have been used.

The laser beam deflectors employing the acousto-optic effect or the elector-optic effect are advantageous in that it is capable of performing random access. However, such types, of beam deflectors are disadvantageous in the great loss of light and the low resolution. The laser beam deflectors using the vibrating mirror is unsuitable for performing a high speed scanning and a sweep of sawteeth waves and for recording images of large size, whereas this type of beam deflectors is advantageous in that the size thereof is compact and the driving circuit therefor is simple in construction. In view of these drawbacks of the above mentioned type of the beam deflectors, the beam deflectors using a rotary polygonal optical element are preferably used in the laser beam recording system.

Even when the beam deflectors using a rotary polygonal optical element are used, however, it is very difficult to record information on a minute recording medium. The beams incident to the deflector from different directions must be directed toward the same scanning line on the small recording medium. This is a great disadvantage of the laser beam recording system, in comparison with the image recording system in which an image on a cathode ray tube is focused on a recording medium using a lens system.

Further, the beam deflectors using a rotary polygonal optical element are disadvantageous in the following two points.

First, the rotary polygonal optical element such as a rotary polygonal mirror or prism requires a highly accurate manufacturing technique in processing the surface of the element and in mounting it to the shaft of a driving motor. All the reflecting or transmitting faces of the optical element must be precisely processed to be in parallel with each other. The optical element must be mounted on the shaft of a driving motor with the faces thereof oriented precisely in parallel to the shaft of the motor. Further, the angles formed between the adjacent faces of the optical element must be precisely processed to be equal to each other. In order to meet these requirements, a highly precise manufacturing technique is required.

Second, in order to form a sharply focused light beam spot by use of the polygonal optical element, a complicated lens system comprising a plurality of lenses of large diameter is required. In the laser beam recording system, the laser beam is required to be converged to a minute spot of the diameter of several microns. The minimum diameter $\delta$ theoretically derived from the diffraction limit is represented by a formula; $\delta = 1.27 f \lambda / D$, where $f$ is the distance from the point of convergence to a converging lens, $\lambda$ is the wavelength of the laser beam and $D$ is the diameter of the laser beam at the aperture of the converging lens. Accordingly, the distance $f$ is desirable to be as short as possible and the diameter D is desirable to be as large as possible to form a minute beam spot. Therefore, the lens system for converging the laser beam to a minute beam spot is required to have a large diameter and a short focal length. However, the lens system which meets such requirements has a number of faces, which lower the power of the laser beam by repeating the reflection thereby.

SUMMARY OF THE INVENTION

In the light of the foregoing observations and description of the conventional laser beam recording system, the primary object of the present invention is to provide a laser beam recording system which employs a polygonal optical element and is able to record information on a microfilm of low sensitivity at a high speed and with high resolution.

Another object of the present invention is to provide a laser beam recording system employing a beam deflecting means using a rotary polygonal optical element in which the error in making the faces of the polygonal optical element in parallel to each other is cancelled, and accordingly, the highly accurate manufacturing process is not required in manufacturing the rotary polygonal optical element.

Still another object of the present invention is to provide a laser beam recording system employing a beam deflecting means using a rotary polygonal optical element in which the laser beam is sharply converged to a minute spot of a diameter of several microns.

A further object of the present invention is to provide a laser beam recording system employing a beam deflecting means using a rotary polygonal optical element in which the laser beam is deflected along very short scanning lines.

The laser beam recording system in accordance with the present invention eliminates the above mentioned drawbacks inherent in the conventional laser beam recording system using a rotary polygonal optical element as a beam deflector. The laser beam recording system in accordance with the present invention employs a simple optical system comprising cylindrical optical elements and an elemental hologram. The term "elemental hologram" referred to in this specification distinguished from "image hologram" is a hologram recorded on a photographic recording plate or the like which has a function to direct a laser beam incident thereto in a predetermined direction. The information holographicaly recorded thereon is therefore different from that which serves for reconstruction of a holographic image. The "elemental hologram plate" referred to in this specification is defined here as a plate bearing a number of said elemental holograms.

The laser beam recording system in accordance with the present invention comprises a laser source, a rotary polygonal optical element such as a rotary polygonal mirror the axis of rotation of which is vertically oriented, a first cylindrical optical element which vertically converges the laser beam from the laser source and forms a horizontally extending linear light spot on the face of the rotary polygonal optical element, a convergent lens located in the optical path of the beams deflected by the rotary polygonal optical element for making the beam advance in parallel to the optical axis thereof, said convergent lens vertically collimating and horizontally converging the beam to form a vertically extending light spot on a first focusing plane, an elemental hologram plate located on said first focusing plane for directing the beams incident thereto in a direction toward an aperture and vertically converging the beam to a horizontal line on a second focusing plane located behind said aperture, and a second cylindrical optical element which is located to have said aperture and horizontally converges the laser beam coming from the elemental hologram plate and forms a converged beam spot on said second plane, whereby the beam converged to a spot scans the surface of a microfilm located on said second plane as said rotary polygonal optical element rotates.

PREFERRED EMBODIMENT OF THE INVENTION

Figure 1:
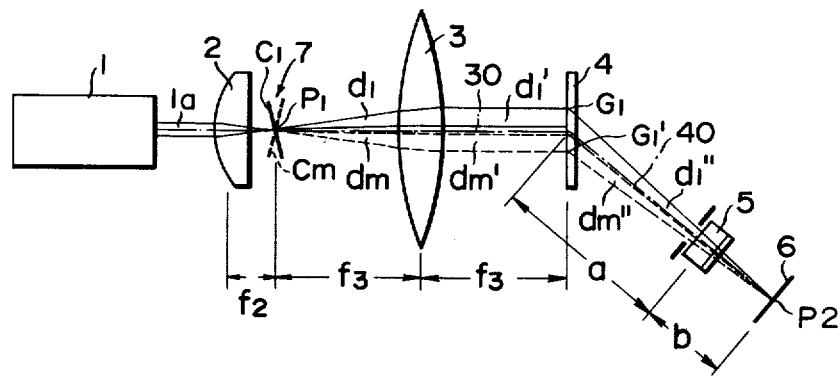
FIG. 1 is a side view showing the arrangement of the optical system of the laser beam recording system in accordance with the present invention.

A side view of the laser beam recording system in accordance with the present invention is illustrated in FIG. 1 which shows the vertical divergence and convergence of the laser beam. The following description of the system made with reference to FIG. 1 is only concerned with the divergence and convergence of the laser beam in the vertical plane. In front of a laser beam source 1 which generates a collimated laser beam 1a is provided a first cylindrical lens 2. The axis of the cylindrical lens 2 is horizontally oriented and the focal length thereof is $f2$. At the focal point P1 of the cylindrical lens 2 is located a rotary polygonal mirror 7 the axis of rotation of which is vertically oriented. When the faces of the polygonal mirror 7 are not accurately in parallel with each other, the direction of the beam reflected thereby changes as the mirror 7 rotates. One inclination of the faces of the mirror 7 is indicated by the reference character Cl and another inclination thereof is indicated by Cm. The beam reflected by a face inclined as indicated by Cl and the beam reflected by another face inclined as indicated by Cm advance in different directions as indicated by $dl$ and $dm$, respectively. A convergent lens 3 the focal length of which is $f3$ is located behind the rotary polygonal mirror 7 at the distance equal to the focal length $f3$ from the mirror 7 to vertically collimate the beams advancing in different directions. As shown in the drawing, the beams $dl$ and $dm$ passing through the convergent lens 3 advance in parallel to the optical axis 30 thereof as indicated by the reference characters $dl'$ and $dm'$. Behind the convergent lens 3 at the distance equal to the focal length $f3$ therefrom, is located an elemental hologram plate 4 to receive the parallel beams $dl'$ and $dm'$.

The elemental hologram plate 4 used here is a plate which carries a number of vertically extending linear elemental holograms. The elemental holograms carried thereon have functions (1) to vertically converge the parallel beams incident thereto within a range which is, vertically defined by the upper end Gl and the lower end Gl' to a point (horizontal scanning line) P2 on a focusing plane 6, and (2) to direct the parallel beams incident thereto in a direction toward an aperture of an optical element provided in front of the focusing plane.

When parallel beams pass through the elemental hologram plate 4, the beams are diffracted by the elemental holograms and converged to the point P2 on the focusing plane 6 on which a recording medium such as a mocrofilm is to be located. Since the beams $dl'$ and $dm'$ impinging on the elemental hologram plate 4 at different points are parallel with each other, they are both converged to said point P2 as indicated by $dl''$ and $dm''$. Thus, the beams $dl$ and $dm$ advancing in different directions due to the inclination of the faces of the rotary mirror 7 are converged to the same point P2. Therefore, the error in making the faces of the rotary polygonal mirror 7 in parallel to each other is canceled by the elemental hologram plate 4.

Behind the hologram plate 4 is located a second cylindrical lens 5. The axis of the second cylindrical lens 5 is vertically oriented with respect to the optical path of the laser beans $dl''$ and $dm''$. More exactly, the axis of the cylindrical lens 5 is in the vertical plane including the optical axis 30 of the convergent lens 3 and is orthogonal to the optical path 40 of the beam diffracted by the elemental hologram plate 4 at the central portion thereof as shown in FIG. 1. Therefore, in the vertical plane, the second cylindrical lens 5 performs no effect on the beams $dl''$ and $dm''$ passing therethrough.

Figure 2:
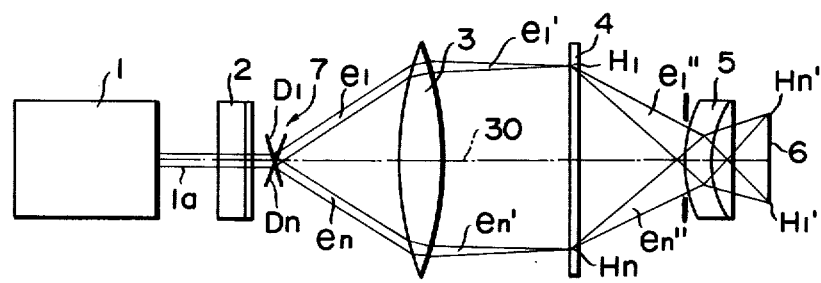
FIG. 2 is a plan view of the optical system as shown in FIG. 1.

The plan view of the laser beam recording system in accordance with the present invention is illustrated in FIG. 2 which shows the horizontal divergence and convergence of the laser beam. Only the horizontal divergence and cnvergence of the laser beams passing through the system will be described in detail hereinbelow with reference to FIG. 2. The laser beam 1a emitted by the laser source 1 is not horizontally effected by the first cylindrical lens 2 since the axis of the lens 2 is horizontally oriented. The laser beam 1a passing through the first cylindrical lens 2 is reflected and deflected by the faces of the rotary polygonal mirror 7. In order to simplify the drawing, the mirror 7 itself is omitted from the drawing and the inclination of the face thereof is represented by lines D$l$ and D$n$. One line D$l$ indicates one position of the face of the mirror 7 in which the face starts to reflect the beam toward the convergent lens 3 where the bean $el$ reflected thereby becomes incident to an edge of the lens 3, and the other line D$n$ indicates another position of the face of the mirror 7 in which the face finishes the reflection of the beam toward the convergent lens 3 where the beam $en$ deflected thereby becomes incident to the other edge of the lens 3. Since the distance between the mirror 7 and the lens 3 is equal to the focal length $f3$ of the lens 3, the beams $el$ and $en$ are refracted by the lens 3 to become in parallel to the optical axis 30 thereof as indicated by $el'$ and $en'$. Further, since the elemental hologram plate 4 is located at the distance equal to the focal length $f3$ from the lens 3, the horizontally collimated beams $el$ and $en$ incident to the lens 3 are converged to points $Hl$ and $Hn$ on the hologram plate 4, respectively. More specifically the vertically diverging and horizontally collimated beams incident to the convergent lens 3 are vertically collimated and horizontally converged to vertically extending linear light spots at the position $Hl$ and $Hn$. The laser beams $el'$ and $en'$ passing through the elememtal hologram plate 4 horizontally diverges as indicated by $el''$ and $en''$ and are directed to the aperture of the second cylindrical lens 5. The horizontally diverging beams $el''$ and $en''$ are converged to points $Hl'$ and $Hn'$ on the focusing plane 6, respectively, by the second cylindrical lens 5 which has the vertically oriented axis. Since the beams $el''$ and $en''$ horizontally diverging from the elemental hologram 4 are vertically converged as shown in FIG. 1, the aperture of the second cylindrical lens 5 may not be so large.

As described hereinabove with reference to FIGS. 1 and 2, the laser beam $1a$ emitted by the laser source 1 is finally converged to a point on the focusing plane 6 on which the recording medium such as a microfilm is to be located. As the rotary polygonal mirror 7 rotates, the beam spot on the focusing plane 6 moves repeatedly from the point $Hl'$ to $Hn'$ in the horizontal direction. Further, even if the faces of the polygonal mirror 7 are not in parallel to each other and the beam is reflected in vertically different directions thereby, the beams are all converged to a point on the same scanning line extending from said point $hl'$ to $Hn'$ on the focusing plane 6.

The length of the scanning line $\overline{Hl' Hn'}$ on the focusing plane 6 can be easily made short by properly selecting the focal length of the second cylindrical lens 5 and selecting the distance between the hologram plate 4 and the lens 5. The length of the scanning line $\overline{Hl' Hn'}$ is represented by a formula $\overline{Hl' Hn'} = \overline{HlHn} \times b/a$, where $a$ is the distance between the elemental hologram plate 4 and the second cylindrical lens 5 and $b$ is the distance between the second cylindrical lens 5 and the focusing plane 6. Since the distance $b$ is the function of the focal length of the second cylindrical lens 5 and the distance $a$ between the lens 5 and the hologram plate 4, which is represented by the formula $b=af/(a-f)$ where $f$ is the focal length of the second cylindrical lens 5, the length of the scanning line $\overline{Hl' Hn'}$ can be properly determined by properly selecting the distance $a$ and the focal length $f$.

The vertical diameter $\delta v$ of the beam spot on the focusing plane 6 is represented by the formula, $\delta v = 1.27 (a+b) \lambda/Dv$, where $\lambda$ is the wavelenght of the laser beam and $Dv$ is the vertical length or diameter of the beam on the hologram plate 4. This formula shows that the vertical diameter $\delta v$ of the beam spot on the focusing plane 6 can be made small by making the angle of divergence of the beam reflected by the mirror 7 large. The angle of divergence is enlarged by shortening the focal length $f2$ of the first cylindrical lens 2. The horizontal diameter $\delta h$ of the beam spot on the focusing plane 6 is represented by the formula, $\delta h=(b/a)Dh$, where $Dh$ is the horizontal length or diameter of the beam on the hologram plate 4 which is equal to the length $\overline{HlHn}$. This formula shows that the horizontal diameter $\delta h$ of the beam spot on the focusing plane 6 can be made small by making the angle of deflection of the beam reflected by the mirror 7 large.

For example, when the diameter of the laser beam $1a$ emitted by the laser source 1 is 2mm, the focal length $f2$ of the first cylindrical lens 2 is 20mm, the number of the faces of the rotary polygonal mirror 7 is sixteen the effective deflecting angle of the mirror 7 is 36°, the convergent lens 3 is an ordinary photographic camera lens, the focal length $f3$ thereof is 50mm, the diameter of the lens 3 is 36mm (F-number is 1.4), and the focal length $f5$ of the second cylindrical lens 5 is 20mm, the horizontal length of the scanning line on the convergent lens 3 is about 32.5mm and the vertical diameter of the beam on the lens 3 becomes 5mm and the horizontal diameter of the beam on the lens 3 becomes 2mm. Further, the horizontal length of the scanning line on the hologram plate 4 becomes 32.5mm, the vertical diameter of the beam on the hologram plate 4 becomes 5mm and the horizontal diameter thereof becomes about $20\mu$. Accordingly, about 1600 beam spots are arranged horizontally on the hologram plate 4. When the second cylindrical lens 5 is located at a position spaced from the hologram plate 4 by 60mm, the focusing plane 6 is spaced from the second cylindrical lens 5 by 30mm because the focal length f5 of the lens 5 is 20mm. This is derived from the formula $b=af/(a-f)$, wherein $a$=60mm and $f$=20mm. Therefore, the reduction ratio $b/a$ is $30/60$=½ and accordingly the horizontal diameter of the spot on the second focusing plane 6 is reduced to a half of $20\mu$, i.e. $10\mu$. The vertical diameter $\delta v$ of the beam spot formed on the second focusing plane 6 becomes about $10\mu$ since the vertical length of the beam spot on the hologram plate 4 is 5mm. This is derived from the formula $\delta v=1.27(a+b)\lambda/Dv$. The length of the scanning line on the second focusing plane 6 becomes about 16mm. Thus, about 1600 beam spots are arranged in side-by-side relationship on the scanning line of about 16mm long on the second focusing plane 6.

Figure 3:
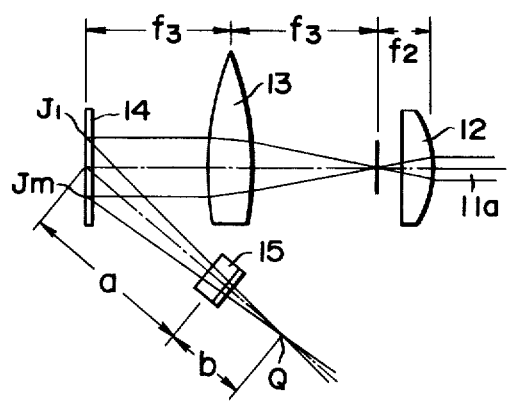
FIG. 3 is a side view showing the optical system for making the elemental hologram used in the laser beam recording system of this invention.
Figure 4:
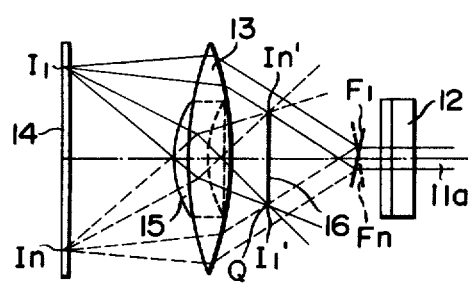
FIG. 4 is a plan view of the optical system as shown in FIG. 3.

Now, the method of making the elemental hologram plate 4 used in the laser beam recording system of this invention will be described in detail with reference to FIGS. 3 and 4. FIG. 3 is a side view of the optical system for making the elemental hologram plate, and FIG. 4 is a plan view of the same. Therefore, FIG. 3 shows the vertical divergence and convergence of the laser beam employed therein and FIG. 4 shows the horizontal divergence and convergence of the same.

In the optical system for making the elemental hologram plate 4, a cylindrical lens 12 is provided in the optical path of the laser beam $11a$ for vertically converging the beam $11a$ to a horizontally extending linear light spot. The axis of the cylindrical lens 12 is horizontally oriented and the focal length thereof is $f2$ which is equal to the that of the first cylindrical lens 2 used in the recording system as shown in FIGS. 1 and 2. At the point where the collimated laser beam $11a$ is converged to a horizontally extending light spot is located a mirror or a prism which digitally deflects the beam in a horizontal plane. The face of the deflecting optical element is rotated from one position $Fl$ to the other $fn$ to horizontally deflect the laser beam as shown in FIG. 4. A convergent lens 13 is located to receive and vertically collimate the vertically diverging beam deflected by the mirror or prism. The laser beam deflected by the mirror or prism and collimated in the horizontal plane is horizontally converged by the convergent lens 13. the convergent lens 13 has the same focal length $f3$ as that of the convergent lens 3 used in the beam recording system and is spaced from the face of the deflecting mirror or prism by the distance of $f3$ so that the beam diverging from the face may be collimated thereby. A holographic recording plate 14 is located behind the convergent lens 13 at the distance equal to the focal length $f3$ thereof, so that the horizontally collimated laser beam incident to the lens 13 may be horizontally converged to a vertically extending linear light spot on the holographic recording plate 14. In the above optical system, the vertical diameter of the laser beam 11a incident to the cylindrical lens 12 must be large enough to make the vertical length $\overline{JlJm}$ of the vertically extending linear light spot on the holographic recording plate 14 cover the range ($\overline{GlGm}$ in FIG. 1) in which there is a possiblilty of receiving the laser beam $dl'$ or $dm'$ deflected by the polygonal mirror 7 in the laser beam recording system shown in FIGS. 1 and 2.

A second cylindrical lens 15 which corresponds to said second cylindrical lens 5 used in the laser beam recording system shown in FIGS. 1 and 2 is located at a position relative to the holographic recording plate 14 that corresponds to the position of the corresponding cylindrical lens 5 relative to said hologram plate 4 in the recording system. A pin-hole Q is located behind the second cylindrical lens 15 at such a position $I_1'$ that the laser beam passing through the pin-hole Q and the cylindrical lens 15 may converge to a point $I_1$ on the holographic recording plate 14 to which the laser beam reflected by the face of the mirror or prism in said position $Fl$ is converged by the convergent lens 13. The pin-hole Q is moved along a line 16 from the position $I_1'$ to another position $ln'$. The laser beam passing through the pin-hole Q at the position $ln'$ is converged by the cylindrical lens 15 to a point $ln$ on the holographic recording plate 14 to which the laser beam reflected by the face of the mirror or prism in said position $Fn$ is converged by the convergent lens 13.

In making elemental holograms on the holographic recording plate 14, a laser beam passing through the pin-hole Q and the second cylindrical lens 15 and converging on the plate 14 is used as an object beam to form a vertically extending linear light spot on the recording plate 14, and another laser beam emitted by the same laser source as that of the object beam and passing through the first cylindrical lens 12 and the convergent lens 13 is used as a reference beam to form a vertically extending linear light spot on the recording plate 14, thereby forming an interference pattern on the recording plate 14. The reference beam is digitally deflected by the deflecting mirror or prism. The vertical length of the linear light spots formed by the object beam and by the reference beam must not be shorter than the vertical length $GlGm$ of said range in which there is a possibility of receiving the laser beam deflected by the polygonal mirror 7 in the recording system. As the digital deflecting mirror or prism is rotated digitally to change the direction of the reference beam deflected thereby and change the position of the spot formed thereby on the holographic recording plate 14, the pin-hole Q is moved along the line 16 to move the position of the spot fromed on the holographic recording plate 14 by the object beam and make it overlapped with the spot formed by the reference beam to form interference patterns in side-by-side relationship on the holographic recording plate 14 from one end $I_1$ to the other $I_n$.

Figure 5:
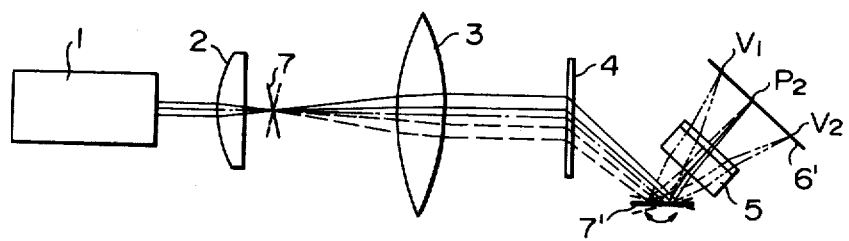
FIG. 5 is a side view showing the arrangement of the optical system of the laser beam recording system in accordance with another embodiment of the present invention in which the laser beam is deflected to perform two-dimensional scanning.

Although the present invention has been described with particular reference to an embodiment thereof in which the laser beam performs one-dimensional scanning, it will be understood that the invention can be effected in two-dimensional scanning by, for instance, as shown in FIG. 5, providing a beam deflector 7' as of vibration type between the hologram plate 4 and the focusing plane 6' to vertically deflect the beam within a range from an upper point $V_1$ to a lower point $V_2$ on the focusing plane 6' in synchronization with the horizontal scanning.

We claim:

1. A laser beam recording system for recording information on a recording medium with a scanning laser beam comprising, in combination, a laser source for emitting a collimated laser beam, a rotary polygonal optical element having an axis of rotation which is vertically oriented, a first cylindrical lens disposed in the optical path of the laser beam emitted by said laser source for vertically converging the laser beam to form a horizontally extending linear light spot on the face of said rotary polygonal optical element, a convergent lens for receiving the beam deflected by said rotary polygonal optical element and for vertically collimating and horizontally converging said beam to form a vertically extending linear light spot on a first focusing plane, a second focusing plane having a recording medium disposed thereon, a second cylindrical lens having an aperture, an elemental hologram plate disposed in said first focusing plane between said convergent lens and said second cylindrical lens for vertically converging the beam passing therethrough and for directing said beam incident thereto, towards said aperture and through said second cylindrical lens for horizontally converging the laser beam incident thereto to form a horizontally extending linear light spot on said second focusing plane behind said aperture, said elemental hologram plate comprising a plate having a plurality of vertically extending linear elemental holograms arranged in parallel relationship with each other and in side-by-side relationship, said second cylindrical lens being arranged to horizontally converge the laser beam incident thereto to form a light spot on said second focusing plane whereby the laser beam scans the surface of said recording medium on said second focusing plane during the rotation of said rotary polygonal optical element.

2. A laser beam recording system as defined in claim 1 wherein said rotary polygonal optical element comprises a rotary polygonal mirror.

3. A laser beam recording system as defined in claim 1 wherein said rotary polygonal optical element comprises a rotary polygonal prism.

4. A laser beam recording system as defined in claim 1 further comprising a second rotary polygonal optical element provided between said elemental hologram plate and said second focusing plane, the axis of rotation of said second rotary polygonal optical element being horizontally oriented.

* * * * *